H. E. GREEN.
APPARATUS FOR AUTOMATICALLY PLAYING MUSICAL INSTRUMENTS.
APPLICATION FILED JULY 23, 1906.

934,606.

Patented Sept. 21, 1909.

Witnesses
B. Dommers
R. W. Helff

Inventor
Henry Edward Green
by Henry Orth
Atty.

H. E. GREEN.
APPARATUS FOR AUTOMATICALLY PLAYING MUSICAL INSTRUMENTS.
APPLICATION FILED JULY 23, 1906.

934,606.

Patented Sept. 21, 1909.
7 SHEETS—SHEET 4.

FIG. 7.

UNITED STATES PATENT OFFICE.

HENRY EDWARD GREEN, OF LEIGH-ON-SEA, ENGLAND.

APPARATUS FOR AUTOMATICALLY-PLAYING MUSICAL INSTRUMENTS.

934,606.   Specification of Letters Patent.   Patented Sept. 21, 1909.

Application filed July 23, 1906.   Serial No. 327,376.

*To all whom it may concern:*

Be it known that I, HENRY EDWARD GREEN, a subject of the King of Great Britain and Ireland, residing at "Elmhurst," Cliff Parade, Leigh-on-Sea, in the county of Essex, England, have invented new and useful Improvements in Apparatus for Automatically-Playing Musical Instruments Provided with a Keyboard, such as Pianos, Organs, and Harmoniums, of which the following is a specification.

This invention relates to improvements in apparatus for automatically playing musical instruments provided with a keyboard such as pianos, organs and harmoniums.

The invention is particularly suitable for ordinary upright pianos as the construction of the automatic playing apparatus is such that it is possible to put the whole of the automatic player apparatus within the case or frame of an ordinary upright piano of the so-called "under damper" and "over strung" construction. The average height of the ordinary piano is 4 feet 3 inches and the end is not usually more than 13¼ inches wide from front to back. Neither do the "fall" and "hollow" need any modification as to shape or dimensions.

The bellows for supplying the pneumatic action with wind is composed of two feeders mounted vertically behind the bottom door or they may be mounted horizontally immediately under the key bottom (that is to say the frame or board on which the key frame is mounted) and these feeders are connected by a conduit or conduits or a pipe or pipes to a reservoir or reservoirs behind the bottom door of the piano case or the said reservoir or reservoirs may also be mounted under the key bottom, said reservoir or reservoirs being connected to the wind chest or chests of the primary pneumatics.

The invention consists in the construction, combination and arrangement of parts as hereinafter fully described in the specification and particularly pointed out in the claims.

A suitable construction is made as follows:—

Figure 1:
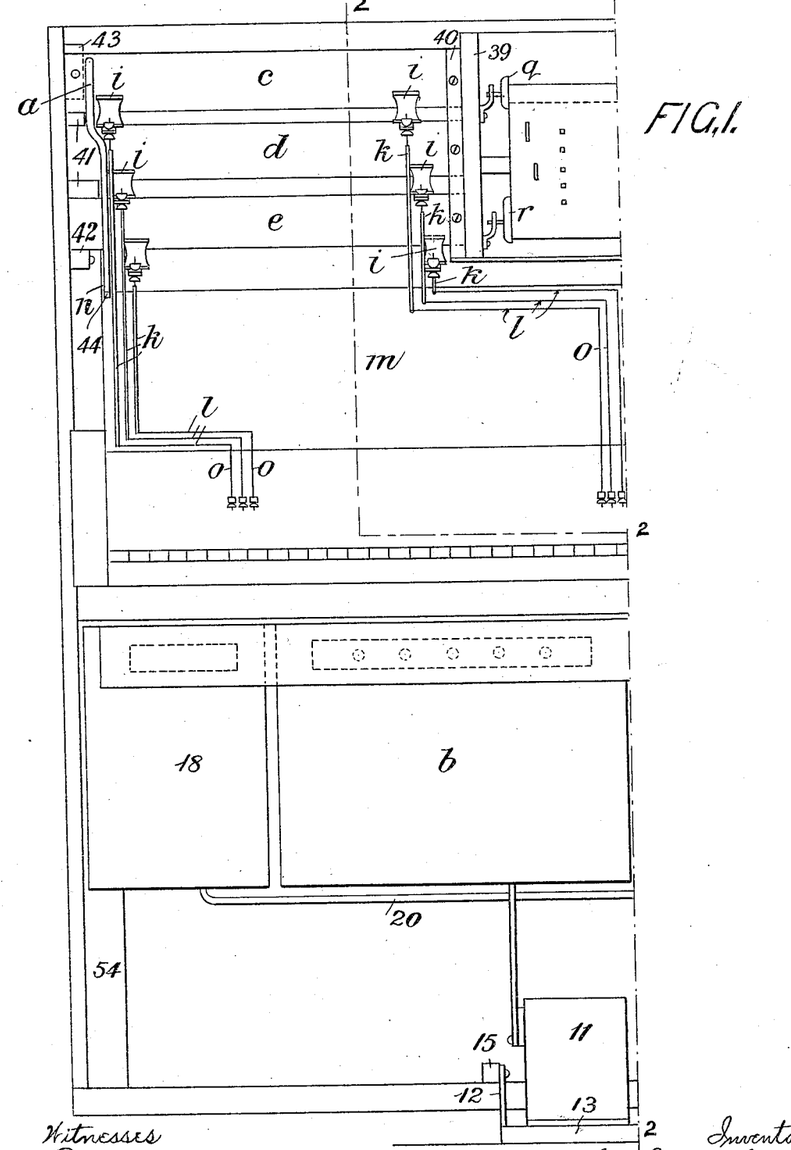
Figure 1 of the accompanying drawings is one half and Fig. 1ª the other half of a front elevation of a piano of ordinary dimensions and construction having the top door, the "hollow" and "fall" and the bottom, removed and provided with a "player" constructed according to this invention.
Figure 1A:
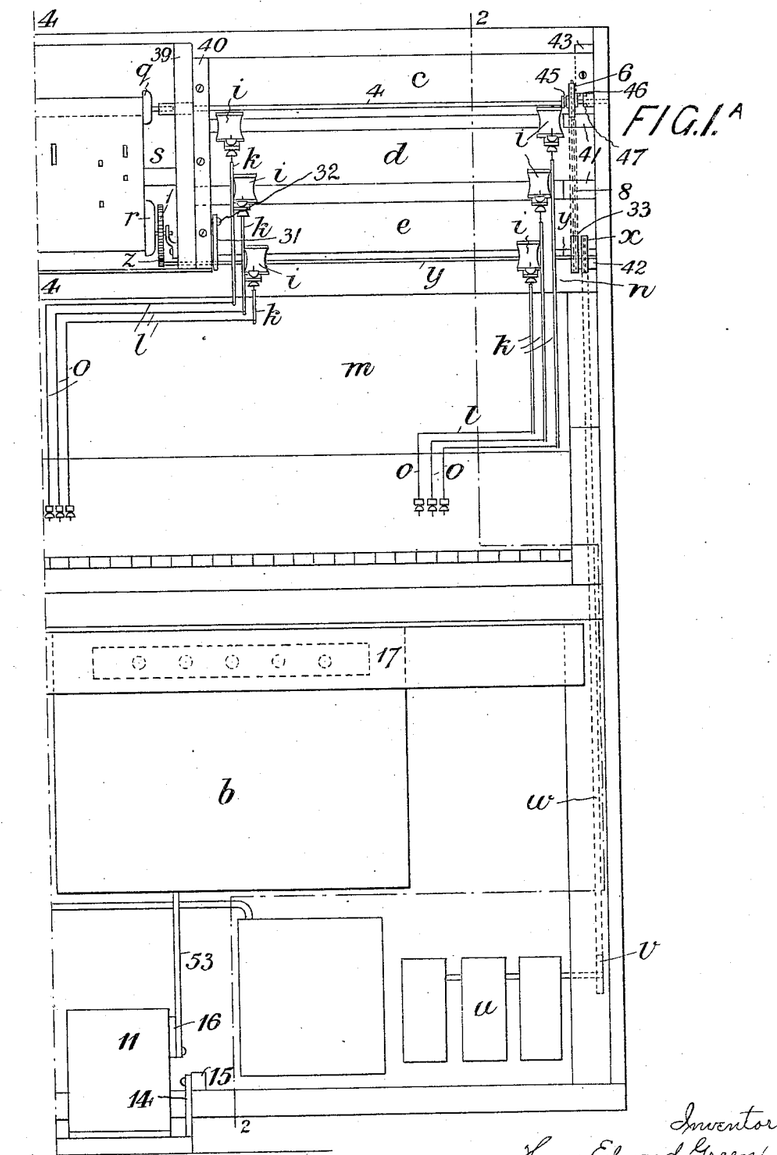

At each end of the instrument there is a wind trunk or pipe *a* one only being shown in Fig. 1, for the sake of clearness which is in connection with the bellows, the feeders *b* of said bellows being mounted immediately under the key bottom and behind the bottom door being fixed thereto or if desired the wind trunk or trunks or the pipes may be placed in any other convenient position. The pipe or pipes *a* or wind trunk or trunks is or are connected to say three wind chests *c d* and *e* arranged horizontally and one over the other. These wind chests *c d* and *e* are provided with the primary pneumatics *f*, (Figs. 2 and 3) one for each note, and in connection with each primary pneumatic is a double valve *g* having seats 26 and 27 said valve being adapted to be operated by said primary pneumatic or puff by being mounted on the same stem *h*. The wind chests *c d* and *e* are each provided with a board 28 screwed to same in which board the valve seats are made but preferably the seats 26 and 27 are made on dished metal plates screwed to the said board 28 and the valve stems *h* are guided in guides 29 in front of said board and in guides 48 at the back of said board inside of the wind chests secured by the same screws as hold the dished metal plates forming the valve seats 26 and 27.

Mounted preferably immediately on the wind chests are the secondary pneumatics $i$ the movable side of each of which is provided with a wire or wooden trace $k$ or other connection which is connected to one of a number of rock shafts $l$ of different lengths. Each of these traces $k$ is provided with a slot like a key hole adapted to engage and retain a crank arm on the end of the rock-shaft $l$ but so as to be easily disconnected therefrom without necessitating the use of separate fastenings such as screw buttons, linch pins or the like, it being understood that the crank arms have knobs just large enough to pass freely through the larger end of the holes like key holes. These rock-shafts are preferably made of wire and are mounted on a board $m$ arranged and secured within the case and in front of the piano action of the instrument in such manner as to rest and be fixed upon the fronts of the piano action standards $n$ by, for instance, four screws so that when the piano action is removed it brings with it the board containing the rock-shafts $l$ and the traces $o$ from the latter and so that the rock-shafts $l$ and the traces $o$ and the levers $p$ (to be presently more fully described) operating the piano action all come away together. The said levers $p$ are pivoted to the stems of the sticker levers $t$ in such manner that when said levers $p$ are moved upward they operate the sticker levers $t$, but the latter may be operated in the usual way from the key board without causing any movement of the levers $p$. If there be two wind trunks these are arranged one at each end or as shown there may be two pipes $a$, one at each end (but one only being shown for the sake of clearness), and the wind chests with their pneumatics $i$ extend toward the middle of the instrument where the spool $q$ (see Figs. 1 and 4) for the music, the take up roller $r$ and the bridge $s$ are mounted.

The casing or frame 39 for the music spool and take up roller is provided with chocks 40 one on each side to which the wind chests $c\ d\ e$ are fixed and at their other ends the said wind chests are connected together by blocks 41. The wind chests $c\ d\ e$ rest upon the tops of the blocks 42 having dowels to keep them in place and at the top are screwed for example two blocks such as marked 43 fixed to the ends of the case of the instrument. By this means it is only necessary to unscrew these two screws and then the two blocks of wind chests with their secondary pneumatics and the traces $k$ may be lifted out bodily (if, as is usual, wind trunks be used to connect the wind chests $c\ d\ e$ with the reservoir or reservoirs of the wind supply). The employment of wind trunks is most convenient, but in the drawing pipes $a$ are shown as being more plainly seen. Even if pipe connections were used, it would only be necessary to disconnect the pipes at each end of the instrument at about the place indicated by 44, (Fig. 1) at the left hand only. Similarly it is evident that if the board $m$ be unscrewed from the piano action standards $n$, the rest of the player mechanism may be removed.

Figures 2, 3, 4, 5, 6:
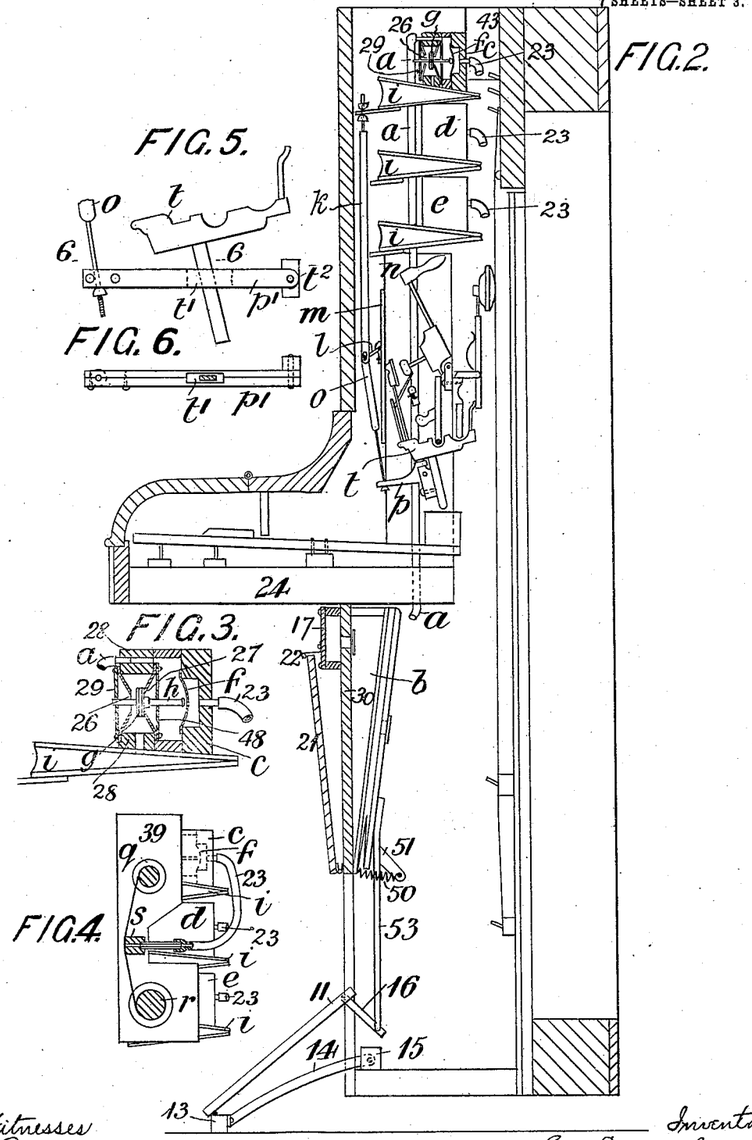
Fig. 2 is a cross section of the instrument on the line 2—2 Fig. 1, and the line 2—2 Fig. 1ª.
Fig. 3 is a detail view to an enlarged scale of the primary and secondary pneumatics with their valve and wind chest.
Fig. 4 is a detail cross section of the spool for the music and the take up roller on the line 4—4 of Fig. 1ª.
Fig. 5 is a detail in elevation of a modification of the means for actuating the sticker lever and Fig. 6 is a horizontal section on the line 6—6 Fig. 5.

The secondary pneumatics $i$ are preferably arranged as shown in Figs. 1 and 2 in banks one above the other, but "staggered" or in other words not directly over each other so that the space required for them is less than the width of the instrument, thus leaving the space in the middle for the take up roller $r$, the music spool $q$ and the bridge $s$, and each primary pneumatic $f$ is as shown clearly in Fig. 4 connected to an orifice in the bridge by means for example of a flexible tube 23.

In order that the motion of the secondary pneumatics may be conveyed to their respective notes, the traces $k$ are of different lengths, the rock-shafts $l$ and their crank arms are of different lengths, and said shafts are mounted one below the other on the board $m$, and the traces $o$ to the levers $p$ are also of different lengths so as to connect properly to the said levers $p$ which are all arranged in one straight level line and mounted on the sticker levers $t$ as aforesaid. If desired however the crank arms of the said rock-shafts $l$ may be of the same length but in that case the effective distance apart of the secondary pneumatics is slightly greater. The connection between the rock-shafts $l$ and a member of the piano action such as the "sticker" levers, is effected in each case by means of a wire trace $o$ aforesaid or other connection which is connected to a second crank arm of each rock shaft and to one arm of the aforesaid lever $p$ mounted on the stem of the sticker lever $t$. Or instead of mounting the levers $p$ for operating the sticker levers $t$ on the latter, the construction shown in Figs. 5 and 6 may be employed. In this case the traces $o$ are connected to levers $p^1$ having slots $t^1$ and pivoted at $t^2$ on a rail at the back of the sticker levers $t$, the slot having for purpose to allow the stem of the sticker lever to pass through.

The motor $u$ for operating the spool of music may be as shown provided with three bellows connected to a crank shaft and having a reservoir or it may be constructed in any other convenient manner and is preferably mounted behind the bottom door 30 of the case as shown in Fig. 1 and on its shaft is mounted a sprocket wheel $v$ which by a chain $w$ communicates motion to another sprocket wheel $x$ fixedly mounted on a shaft $y$. This shaft $y$ has a pinion $z$ engaging with a toothed wheel 1 mounted on the take up roller $r$. This end of the shaft $y$ is mounted in a bracket 31 adapted to swing on a pivot 32 so that the pinion $z$ may be in gear or out of gear with the said toothed wheel 1. Motion is also communicated at desire to the spool $q$ to enable the re-rolling of the music to take place by means of a shaft 4 having a sprocket wheel 6 loose on the said shaft 4 over which wheel 6 and over a sprocket wheel 33 on the shaft $y$ passes a chain 8. The sprocket wheel 6 has a groove 45 for receiving a pin which is operated in a well known manner in connection with the pivoted bracket 31 by a pull out stop or lever and the other end of the boss of the sprocket wheel 6 is provided with a clutch finger 46 or the like which may engage with or be disengaged from a clutch part 47 fixed on the shaft 4. By this means the music is taken up by the "take-up" roller $r$ or is re-rolled on the music spool $q$ in the well known manner.

The bellows $b$ are operated by means of pedals 11 hinged to a frame 12, 13, 14, which is itself hinged to the blocks 15, 15, within the piano case. The pedals 11, (Figs. 1 and 2), connect with the arms 53 fixed to the movable sides of the bellows or feeders $b$ by means of connecting rods or links 16 and the trunk 17 of the feeders, also communicates with the reservoir 18 which is screwed or otherwise fastened to a pilaster 54. The said reservoir (or there may be more than one) is connected to the motor by a pipe 20. The feeders are returned to their normal closed positions by means of springs 50 each of which is connected at one end to an arm 51 on the bellows and at the other end to a hook on the bottom door 30 or elsewhere. The bottom door is made with an opening covered with a flap 21 which is hinged so as to allow of the pedals 11 being raised and swung up and back on their frame 12, 13, 14 in such manner that the said pedals are out of the way within the piano case when not required, after which the hinged flap is allowed to fall down and hide the pedals. If desired the hinged flap is kept in its raised position by a spring catch 22.

Figure 7:
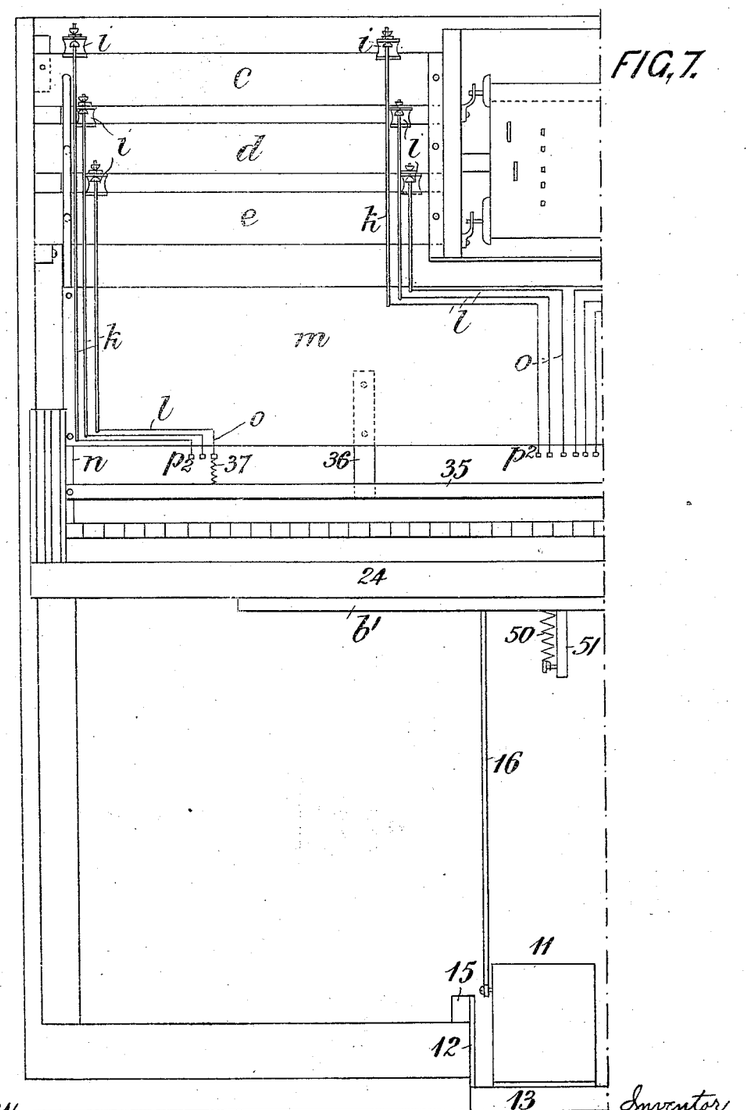
Fig. 7 is one half and Fig. 7ª the other half of a front elevation of a piano provided with a modified construction of apparatus and Fig. 8 is a cross section on the line 8—8 of Fig. 7ª.
Figure 7A:
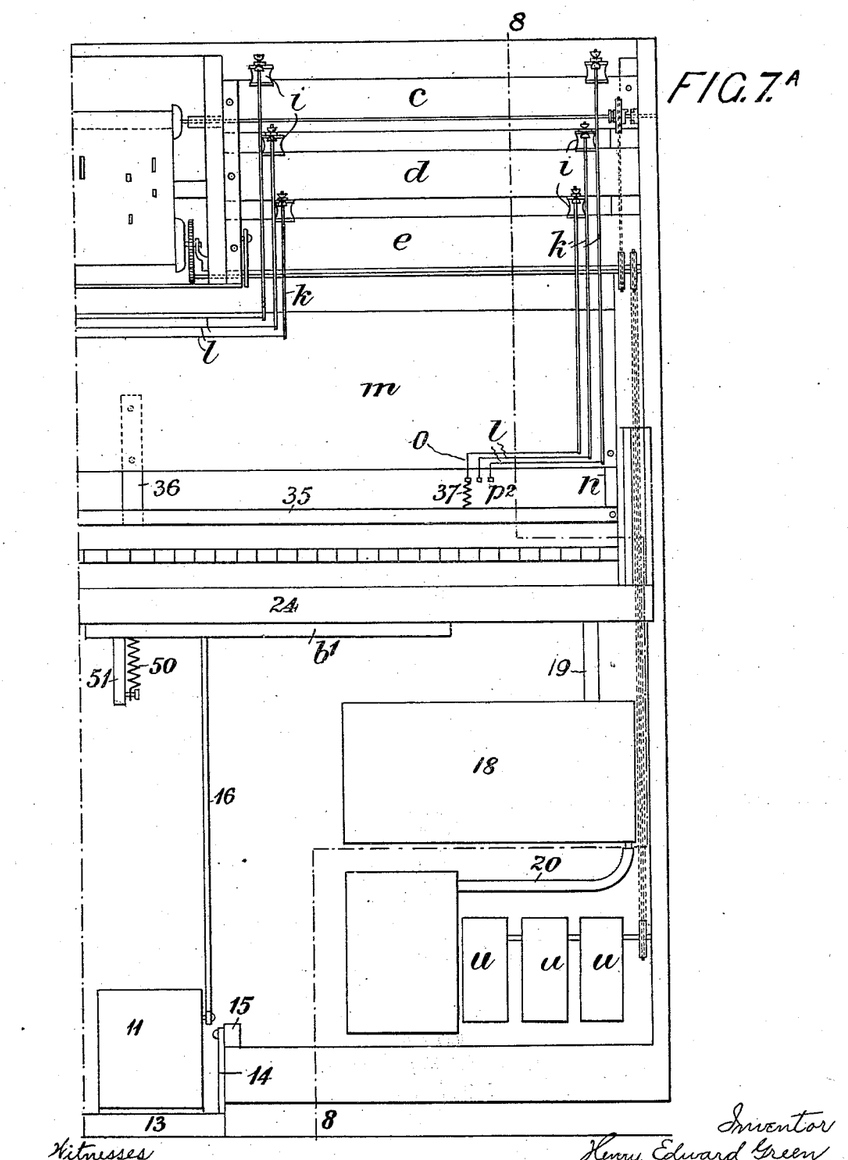
Figure 8:
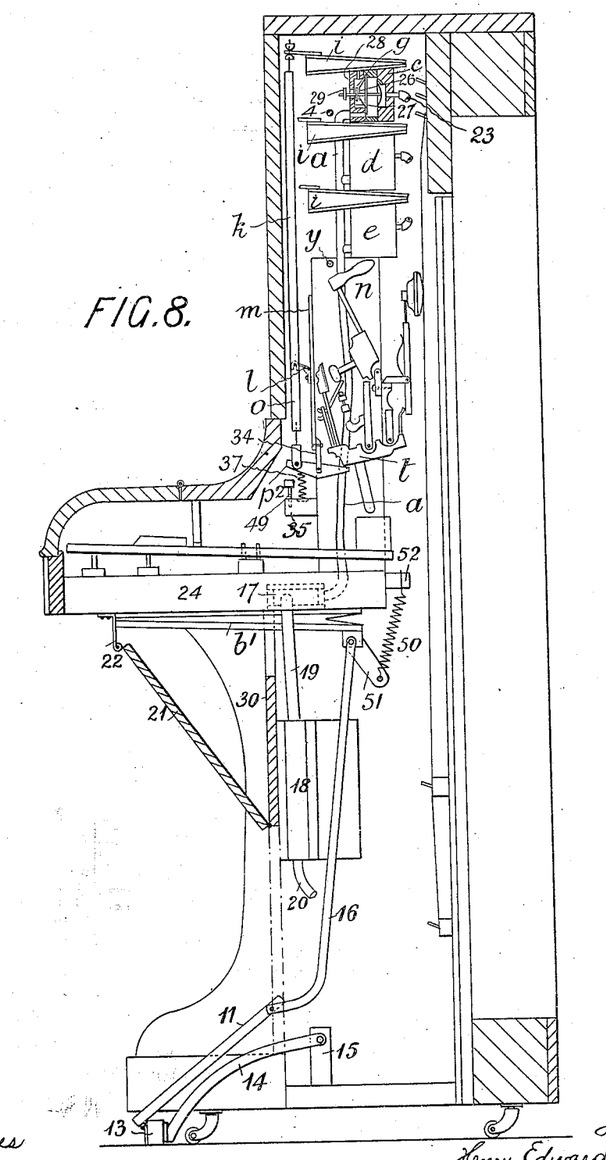

The construction of apparatus shown in Figs. 7 and 8 is very similar to that already described, the principal points of difference being:—

(1) That the secondary pneumatics $i$ are mounted on top of instead of below the wind chests $c$ $d$ and $e$.

(2) That the secondary pneumatics operate the piano action by pushing down the rock shafts $l$ instead of raising them and that consequently the lower ends of the traces $k$ and the upper ends of the traces $o$ are merely fork shaped as motion is communicated by pushing instead of pulling.

(3) The lower ends of the traces $o$ are connected to certain double armed levers $p^2$ which are mounted in forked brackets 34 screwed on to the back of the same board $m$ as the rock-shafts $l$ and the inner end of each of these double armed levers is adapted to come into contact with a collar or the like on the sticker, or as shown directly on to the sticker lever $t$. The rail 35 is secured to the board $m$ by arms 36 (shown only in Fig. 7) and at each end to the action standards $n$. The said rail 35 supports a number of springs 37 which tend to keep the said levers $p^2$ in their normal position and there are regulating buttons 49 adjustably screwed into the rail to limit the movement of the said levers $p^2$, as shown only in Fig. 8.

Figures 9, 10:
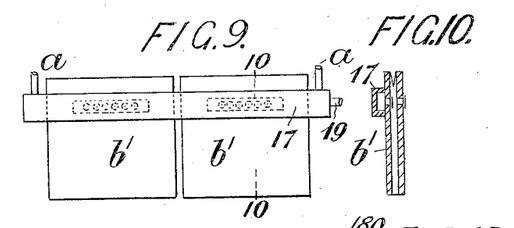
Fig. 9 is a plan of the feeders arranged below the key bottom and Fig. 10 is a section thereof on the line 10—10 Fig. 9.

(4) The bellows or feeders $b^1$ are mounted horizontally below the key bottom 24 instead of vertically behind the bottom door of the piano as in the previous construction. The bellows $b^1$ are operated by means of pedals 11 which by connecting rods or links 16 are connected to the movable sides of the bellows and the trunk 17 of the feeders (see also Figs. 9 and 10) also communicates with the reservoir 18 by the pipe 19. The reservoir is connected to the motor $u$ by a pipe 20. The feeders are returned to their normal closed position by means of springs 50, each of which is connected at one end to an arm 51 on the movable side of the bellows and at the other end to a bracket 52 fixed at the back edge of the key bottom 24. As in the previously described construction the frames 12, 13 and 14 to which the pedals 11 are hinged, are pivoted to the blocks 15 within the piano case. The bottom door 30 is also made with an opening covered by a flap 21 which is hinged so as to allow of the pedals being raised and swung back into the case on their frame and the flap is held in its raised position by a spring catch 22 fixed to the key bottom.

Figures 11, 12, 13:
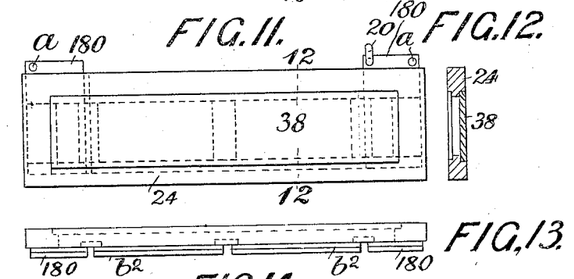
Fig. 11 is a plan of the key bottom with the feeders and reservoirs arranged below same.
Fig. 12 is a section of the key bottom on the line 12—12 Fig. 11.
Fig. 13 is a front view thereof.
Figure 14:
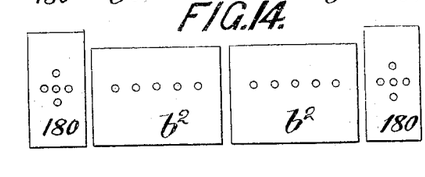
Fig. 14 is a plan of the feeders and reservoirs with the key bottom removed and Fig. 15 is an end view of a reservoir.
Figure 15:
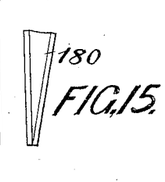

Or as shown in Figs. 11, 12, 13, 14 and 15, the key bottom 24 is covered in at the top by a board 38 and has mounted underneath the same the bellows or feeders $b^2$ $b^2$ and the reservoirs 180, 180, in such manner that the key bottom itself forms the wind trunk, the result being that all the bellows devices are mounted underneath the same. In Fig. 11, $a$ $a$ represent the pipe connections to the pneumatic wind chests and 20 is the pipe to the motor, but it is of course evident that wind trunks or conduits made of wood may be used instead of pipes.

A distinct advantage is obtained by mounting the secondary pneumatics on top of or underneath the wind chests as, by this arrangement, the space required from front to back for the secondary pneumatics is equal only to the length of the said pneumatics whereby the primary and secondary pneumatics may occupy the usually wasted space behind the top door and over the hammers of the action. A further advantage is that the distance from each secondary pneumatic to its wind chest is much shorter than in any previously known construction.

What I claim as my invention and desire to secure by Letters Patent is:—

1. In an automatic player for pianos and similar instruments the combination with a piano action, of a plurality of rows or banks of primary wind chests, a primary pneumatic and a valve in each wind chest, a perforated bridge over which a perforated music sheet passes, a plurality of conduits or pipe connections between said primary pneumatics and the perforated bridge, a plurality of secondary pneumatics mounted horizontally and connected to said wind chests, the rows of the latter being arranged on each side of said bridge, a motor for moving said perforated music sheet, bellows devices connected to the wind chests, bridge pneumatics and motor, and means for communicating motion from said secondary pneumatics to the piano action, substantially as set forth.

2. In an automatic player for pianos and similar instruments, the combination with a piano action, of a plurality of rows or banks of primary wind chests, a perforated bridge mounted midway between the two ends of the instrument and over which a perforated music sheet passes, a primary pneumatic and valves in each wind chest, a plurality of conduits or pipe connections between said primary pneumatics and the perforated bridge, a plurality of secondary pneumatics mounted horizontally and connected to said wind chests, the rows of the latter being arranged on each side of said bridge, a motor for moving said perforated music sheet over said bridge, bellows devices connected to said wind chests, bridge, pneumatics and motor, and means for communicating motion from said secondary pneumatics to the piano action.

3. In an automatic player for pianos and similar instruments, the combination with a piano action, of a plurality of rows or banks of primary wind chests, a primary pneumatic and valve in each wind chest, a perforated bridge mounted midway between the two ends of the instrument and over which a perforated sheet of music passes, a plurality of conduits or pipe connections between said primary pneumatics and the perforated bridge, a plurality of secondary pneumatics mounted horizontally and connected to said wind chests, the rows of the latter being arranged on each side of said bridge, a motor for moving said perforated music sheet over said bridge, bellows devices connected to said wind chests, bridge, pneumatics and motor, a plurality of double armed levers mounted below said secondary pneumatics, a connection between the movable side of each of said secondary pneumatics and one arm of a double-armed lever, and means for communicating motion from the other arms of said double-armed levers to the piano action.

4. In an automatic player for pianos and similar instruments, the combination with a piano action, of a plurality of rows or banks of primary wind chests, a primary pneumatic in each wind chest, a perforated bridge mounted midway between the two ends of the instrument, a perforated sheet of music movable over the bridge, a plurality of conduits or pipe connections between the primary pneumatics and the perforated bridge, a plurality of secondary pneumatics mounted on the underside of and connected to said wind chests, the rows of the latter being arranged on each side of said bridge, a motor for moving the perforated music sheet over said bridge, bellows devices connected to said wind chests, bridge, pneumatics and motor, a plurality of double armed levers mounted below said secondary pneumatics, a connection between the movable side of each of said secondary pneumatics and one arm of a double-armed lever, and means for communicating motion from the other arms of said double armed levers to the piano action.

5. In an automatic player for pianos and similar instruments, the combination with a piano action, of a plurality of rows or banks of primary wind chests, a primary pneumatic in each wind chest, a perforated bridge mounted midway between the two ends of the instrument, a perforated sheet of music movable over the bridge, a plurality of conduits or pipe connections between said primary pneumatics and the perforated bridge, a plurality of secondary pneumatics mounted on the underside of and connected to said wind chests, the rows of the latter being arranged on each side of said bridge, a motor for moving said perforated music sheet over said bridge, bellows devices connected to said wind chests, bridge, pneumatics, and to drive said motor, a plurality of double-armed levers mounted below said secondary pneumatics, a connection between the movable side of each of said secondary pneumatics and one arm of a double-armed lever, a plurality of sticker levers, a plurality of levers fulcrumed below and behind the sticker levers adapted to actuate the latter, and a connection between the other arm of each of the double armed levers and the levers fulcrumed below the sticker levers.

6. In an automatic player for pianos and similar instruments, the combination with a piano action, of a perforated bridge over which a perforated sheet of music passes, a plurality of rows or banks of primary wind chests arranged on each side of said perforated bridge, a primary pneumatic and valve in each wind chest, a plurality of conduits or pipe connections between said primary pneumatics and the perforated bridge, a plurality of secondary pneumatics mounted horizontally with their outer free ends toward the front and connected to said wind chests, a motor for moving said perforated music sheet, bellows devices connected to the wind chests, bridge, pneumatics and motor, and means for communicating motion from said secondary pneumatics to the piano action.

7. In an automatic player for pianos and similar instruments, the combination with a piano action, of a plurality of rows or banks of primary wind chests mounted one above the other and fixed together so as to be bodily removable, a perforated bridge over which a perforated music sheet passes, said wind chests being arranged in blocks one on each side of the perforated bridge, a primary pneumatic and valve in each wind chest, a plurality of conduits or pipe connections between said primary pneumatics and the perforated bridge, a plurality of secondary pneumatics mounted horizontally and connected to said wind chests, a motor for moving said perforated music sheet, bellows devices connected to the wind chests, bridge, pneumatics and motor, and means for communicating motion from said secondary pneumatics to the piano action.

8. In an automatic player for pianos and similar instruments, the combination with a piano action and a plurality of secondary pneumatics, of a plurality of rock shafts mounted one above the other, having crank arms thereon, means for communicating the motion of each secondary pneumatic to one of the crank arms and means for communicating motion from the other crank arm to a member of the piano action.

9. In an automatic player for pianos and similar instruments, the combination with a piano action and a plurality of secondary pneumatics, of a plurality of rock shafts of different lengths mounted one above the other, having crank arms thereon, means for communicating the motion of each secondary pneumatic to one of the crank arms and means for communicating motion from the other crank arm to a member of the piano action.

10. In an automatic player for pianos and similar instruments, the combination with a piano action and a plurality of secondary pneumatics, of a removable board, a plurality of rock shafts mounted one above the other on said board, and having crank arms thereon, means for communicating the motion of each secondary pneumatic to one of the crank arms, and means for communicating motion from the other crank arm to a member of the piano action.

In testimony whereof I have signed my name to this specification in the presence of two subscribing witnesses.

HENRY EDWARD GREEN.

Witnesses:
H. D. JAMESON,
V. JENSEN.